Oct. 16, 1956  W. K. DODGE, SR  2,766,546
FISH LURE
Filed May 22, 1953
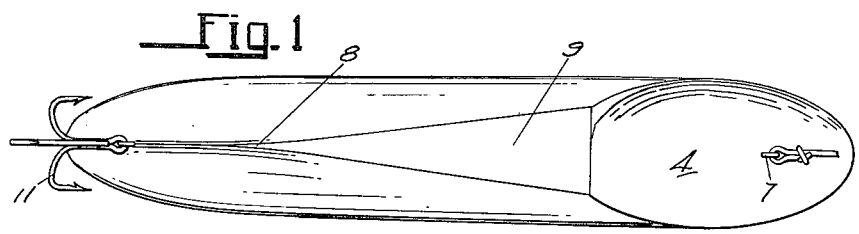
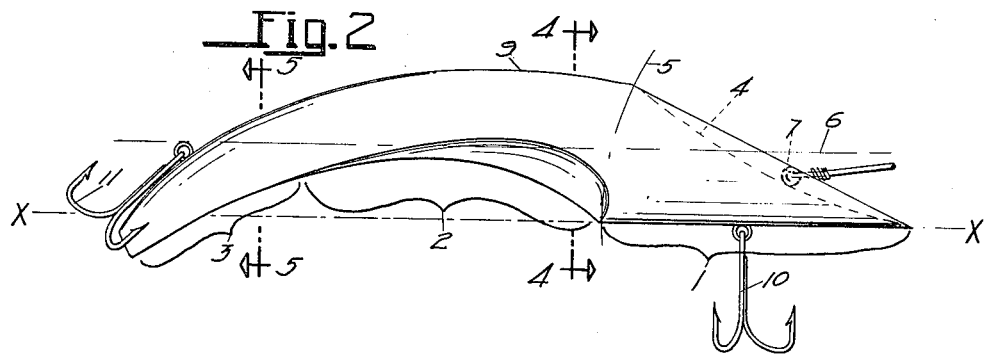
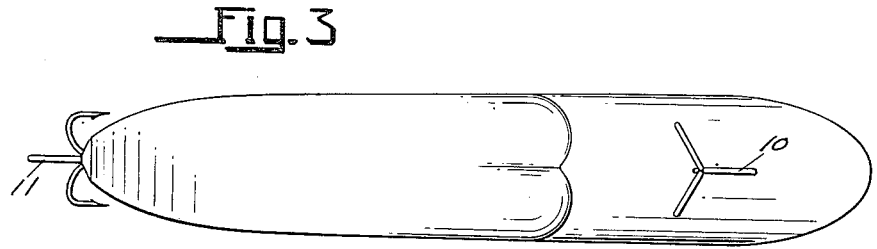
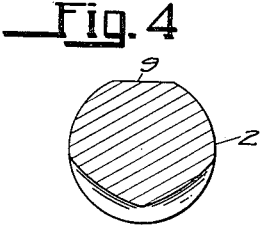  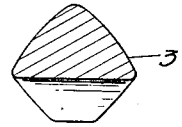
INVENTOR.
WILL K. DODGE SR.
BY
Boyken, Mohler & Beckley
ATTORNEYS

United States Patent Office 2,766,546
Patented Oct. 16, 1956

2,766,546

FISH LURE

Will K. Dodge, Sr., Fort Bragg, Calif., assignor of one-half to Loria W. Johnson, Fort Bragg, Calif.

Application May 22, 1953, Serial No. 356,673

3 Claims. (Cl. 43—42.48)

This invention relates to a fish lure, or plug such as used for bass, salmon and other fish, and has for its principal object the provision of a plug or lure that will more nearly simulate the movement of an injured fish when the plug is drawn through the water, than has heretofore been done.

One of the objects of the present invention is to provide a plug that will weave back and forth and that will roll from side to side as it is drawn through the water.

Another advantage of the plug of this invention is that the hook or hooks may be positioned at virtually any plane on the plug without materially changing its manner of operation. This is quite important since some fish approach a lure from the front while others approach it from the rear, and the effectiveness of the lure depends upon where the hook or hooks are positioned.

Other objects and advantages will appear in the description and in the drawings.

In the drawings,

Fig. 1 is the top plan view of a preferred form of the invention.

Fig. 2 is a side elevational view of the plug.

Fig. 3 is a bottom plan view.

Fig. 4 is a cross-sectional view taken at line 4—4 of Fig. 2.

Fig. 5 is a cross-sectional view taken at line 5—5 of Fig. 2.

For convenience of description, the lure illustrated may be said to be composed of a head portion 1, central section 2, and tail 3. The central section and tail merge into each other so their juncture is not as definite as in the case of the head and central portion.

The head 1 is generally circular in cross sectional contour at its under and lateral sides and is formed with an upper face 4 that extends diagonally or slantingly upwardly and rearwardly from the lowermost edge of the leading point on said head, and a line 5 drawn about said point as a center will substantially define the length of said face as well as the length of the undersurface of said head. The invention is not to be necessarily limited to such a precise measure, but preferably substantially that proportion or measure has been found to be most satisfactory; as has been about a thirty degree inclination of the leading face of the plug relative to its axis 6. An angle of between say twenty five and thirty degrees has been found to be satisfactory, but where the angle reaches about forty degrees the movement is not satisfactory at relatively slow speeds, although the angle may be approximately forty degrees where the plug is used only at relatively high speeds.

As seen in Figure 2, the face 4 is also preferably slightly concave from all edges and an eye screw may be secured on face 4 with the eye 7 in a vertical medial plane extending longitudinally of the plug, although the eye may be placed at the most suitable place between the forward and rear edges of said face and at the most desired distance from the latter. Normally a portion of the outer edge of the eye is about in the same plane as the edges of the concave face, as seen in Figure 2.

The lower or belly surface of the central section 2 is concavely curved longitudinally of the plug, and the curve extends upwardly at its forward end from the rear edge of the underside of the head and then downwardly with the cross sectional contour of the said belly surface generally V-shaped (Figure 4) at the forward end portion. This V shape flattens out to merge with the flat undersurface of the tail 3. This latter flat undersurface is flat in direction transversely of the axle of the lure, (Figure 5) and there may be a gradual curve of said undersurface longitudinally of the plug. The provision of such an undersurface to the tail is important, since the action is not as satisfactory where such undersurface is rounded in direction transversely of the axis of the plug. The upper surface of the tail is convexly curved in a transverse direction.

As best seen in Figure 2 the tail extends below the level of line X—X, which line represents the level of the undersurface of the head, and which is parallel with the axis 6 of said head.

In Figures 1 and 2 it will be seen that the back curves convexly longitudinally from the rear edge of the head to the end of the tail, but the length of such back from said rear edge to point 8 (Figure 1) that is intermediate said rear edge and the end of the tail is flattened transversely of the length of the plug (Figure 4) and tapers longitudinally from the rear edge of the head to the point 8.

The flattened back surface 9 extends slightly upwardly from the said rear edge of the leading face 4 to a point about midway between the ends of the plug, and this flattened surface contributes materially to the desired action of the plug when it is being drawn through the water.

Hooks 10, 11 are shown as being respectively at the underside of the head and at the upper side of the tail. They can be placed anywhere on the plug that is found to be most desirable since they do not modify the action of the plug to an undesirable degree.

As seen in Figs. 1 and 2, the plug preferably tapers uniformly rearwardly, except for a slightly more abrupt taper at the end of the tail.

The overall length of the plug is preferably as shown, and may be from about two to three times the length of the head, while the maximum thickness of the plug is preferably about one half the length of the head portion.

The foregoing proportions are not necessarily to be considered restrictive of the invention. The preferred proportions are as shown in the drawings, and changes may be made in these within the scope of the invention as defined in the claims.

I claim:

1. A fish lure comprising a horizontally elongated solid plug having a head portion, a central section and a tail generally in axial relation, the underside of said head portion being convexly curved transversely of the length of the lure and substantially straight longitudinally of said lure, and said portion being formed with a rearwardly upwardly inclined leading face extending from the substantially leading end of said underside of said head portion and terminating at a point approximately opposite to the rear end of the curved underside of said head portion, the upper side of said central section having a flat surface extending rearwardly from the rear edge of said leading face and of progressively decreasing width in a direction away from said rear edge, the underside of said central section being concavely curved in a direction longitudinally of said lure with the forward end of the underside of said central section being generally V- shaped in a direction transversely of the length of the lure, the upper side of said tail being convexly rounded and the underside of said tail being substantially flat and the tail section being curved downwardly to project below a straight line coincidental with and in rearward projection of the lowermost part of said straight undersurface of said head portion, the undersurface of said central section being spaced above said last mentioned straight line.

2. A fish lure comprising a horizontally elongated solid plug having a head portion, a central section and a tail in successively adjoining relation along the longitudinal axis of said plug with said head portion and tail respectively at the leading and trailing ends thereof, said plug being substantially circular in cross sectional contour and concentric with said axis at approximately the juncture between said head portion and said central section, and the lower side of said head extending straight and substantially parallel with said axis, said tail projecting below said axis and below the level of the underside of said head and the under side of the major length of said central section longitudinally of said axis being spaced above the level of the underside of said head, and concavely curved in a direction longitudinally of said plug.

3. A fish lure comprising a horizontally elongated solid plug having a head portion, a central section and a tail in successively adjoining relation along the longitudinal axis of said plug with said head portion and tail respectively at the leading and trailing ends, said head portion being formed with a rearwardly upwardly inclined leading face, the lower half of said head portion having a rounded cross sectional contour in a plane perpendicular to said axis and the lower side of said tail being substantially flat and extending below the level of the lowermost side of said head portion, the major length of the lowermost side of said central section extending longitudinally of said plug being spaced above said level, said lowermost side of said head portion being substantially parallel with said axis and approximately equal in length to that of the lower side of said central section.

References Cited in the file of this patent

UNITED STATES PATENTS

| | | |
|---|---|---|
| 1,499,689 | Pflueger et al. | July 1, 1924 |
| 1,845,890 | Schwanbeck et al. | Feb. 16, 1932 |
| 2,314,907 | Sweeney | Mar. 30, 1943 |
| 2,536,553 | LaFleur | Jan. 2, 1951 |
| 2,565,205 | Culver | Aug. 21, 1951 |
| 2,578,532 | Forsberg | Dec. 11, 1951 |
| 2,641,862 | Poe | June 16, 1953 |
| 2,711,609 | Bailey | June 28, 1955 |